United States Patent Office 3,378,354
Patented Apr. 16, 1968

3,378,354
SYNTHESIS OF CALCIUM CHLORSPODIOSITE
Robert L. Hickok, Euclid, Ohio, assignor to General Electric Company, a corporation of New York
No Drawing. Filed Dec. 8, 1965, Ser. No. 512,505
3 Claims. (Cl. 23—368)

ABSTRACT OF THE DISCLOSURE

A process for producing calcium chlorspodiosite, $Ca_2ClPO_4$, by reacting together at elevated temperatures $CaHPO_4$ and $CaCO_3$ to obtain a mixture of $Ca_3(PO_4)_2$ and CaO, then mixing granular $NH_4Cl$ with this mixture and heating. $CaCl_2$ is formed in situ by reaction of HCl from the $NH_4Cl$ with CaO. The $CaCl_2$ reacts with the $Ca_3(PO_4)_2$ to form the desired particulate $Ca_2ClPO_4$. Excess $CaCl_2$ can be removed by washing with water. The method avoids difficulties of the prior art stemming from deliquescence because of the formation of $CaCl_2$ in situ. Calcium chlorspodiosite produced by this process is especially useful in the production of lamp phosphors.

---

This invention concerns a new and useful process for the production of calcium chlorspodiosite, $Ca_2ClPO_4$. More particularly it is concerned with the production of $Ca_2ClPO_4$ of high purity and crystallinity and in small particle sizes and non-sintered condition, useful in the production of lamp phosphors.

Calcium chlorspodiosite, $Ca_2ClPO_4$, is a colorless crystalline compound structurally related to the mineral wagnerite. It was reported by R. Nacken in his study of the phase relationships which obtain in the system $CaCl_2$-$CaO$-$P_2O_5$, Centralblatt f. Mineralogie, Geologie u. Paläontologie, 1912, p. 545–559. Synthesis of the compound by dissolving $Ca_3(PO_4)_2$ in fused $CaCl_2$ was reported by R. Klement and F. Gembruch, Naturwissenschaften 29, 301 (1941).

The various known methods for preparing spodiosite involve as a final reaction step a high temperature reaction between $CaCl_2$ and one of the calcium phosphates such as $Ca_3(PO_4)_2$, $CaHPO_4$ or $Ca_2P_2O_7$. Of these calcium phosphate compounds only tribasic calcium orthophosphate, $Ca_3(PO_4)_2$, gives a straightforward reaction to $Ca_2ClPO_4$ with no loss of phosphorus as $POCl_3$ or $PO_2Cl$ or other volatile compound or formation of undesirable side products such as CaO and $CaH_2P_2O_7$. Thus the best combination of reactants is $Ca_3(PO_4)_2$ and $CaCl_2$. However, dispersion of a predetermined quantity of $CaCl_2$ in a powdered reactant poses a serious problem due to the deliquescence of $CaCl_2$ and the difficulty in obtaining it as a finely divided powder. The presence of water or of HCl is detrimental during firing since these react at high temperature with calcium chlorophosphates to form volatile phosphorus compounds.

Also, methods of prior art have not readily produced $Ca_2ClPO_4$ with the preferred extent of the crystallinity and purity.

It is an object of the present invention to provide a process for the synthesis of $Ca_2ClPO_4$ overcoming the above-mentioned difficulties and producing $Ca_2ClPO_4$ particulate material especially suited for use in the production of lamp phosphors as described and claimed in co-pending patent application Ser. No. 512,537, filed concurrently herewith.

Further objects and advantages of the invention will appear from the following detailed description.

Briefly stated, the present invention in one form provides for the production of $Ca_2ClPO_4$ by a process involving the formation of $CaCl_2$ in situ within the reaction mixture and under a non-reactive atmosphere. "Non-reactive," as used herein, means not deleteriously reactive with the reaction mixture which it envelops. $CaHPO_4$ and $CaCO_3$ are reacted to form $Ca_3(PO_4)_2$ and CaO. $NH_4Cl$ is then added and the mixture reacted to produce $Ca_2ClPO_4$ crystals embedded in $CaCl_2$ which is removed by leaching such as with water to free the $Ca_2ClPO_4$ crystals.

As a first step, the reactants $CaHPO_4$ and $CaCO_3$ are provided in approximately equimolar ratios and fired at elevated temperatures to produce a mixture of $Ca_3(PO_4)_2$ and CaO. Preferably, the reaction is carried out at temperatures in the range of 1050–1150° C., or about 1100° C. in an open crucible in air. The $CaHPO_4$ deviates slightly from stoichiometry in having a slight excess of CaO, resulting in a mole ratio of products of about 1:1.02 $Ca_3(PO_4)_2$:CaO.

Next, as a second step, this intermediate product mixture is mixed with granular $NH_4Cl$ in an amount in excess of two moles, preferably about three moles, for each two moles of $CaHPO_4$ initially provided. This final mixture is then fired under a non-reactive atmosphere such as nitrogen at a temperature in the range of 750–850° C., preferably about 760–780° C. This can be done in a loosely covered crucible. The reaction proceeds by formation of $CaCl_2$ in situ due to the reaction of HCl, from decomposition of $NH_4Cl$, with CaO as the temperature of the mixture rises. Reaction of the $CaCl_2$ with $Ca_3(PO_4)_2$ then follows as the mixture is heated to the final temperature. Since the HCl is volatile and can escape from the reaction mixture an excess of $NH_4Cl$, normally about 50% is provided. The amount of excess required is determined in part by the size of sample and configuration of the containment vessel. A nitrogen atmosphere is used to prevent reaction of $CaCl_2$ with $O_2$, reverting back to CaO.

Finally, as a third step, the compact cake thus formed can be separated by lixiviating such as with water.

At temperatures above about 760° C. a liquid phase exists in the system $CaCl_2$-$Ca_3(PO_4)_2$ near the $CaCl_2$ end of the phase diagram. This is a few degrees below the melting point of $CaCl_2$ at 772° C. If the spodiosite firing mixture is fired in the range from 760–770° C., a liquid phase is formed. This phase functions as a flux and results in formation of the $Ca_2ClPO_4$ as very clear homogeneous particles. As the reaction proceeds to conclusion, the fluxing action nearly ceases as the $CaCl_2$ is largely consumed. At this point particle growth also ceases as does particle-to-particle fusion. The normally present slight excess, i.e., ~2% of CaO in the firing mixture is now excess $CaCl_2$. If the firing is carried out at temperatures substantially higher than 780° C., i.e. 900° C. for example, or if a mixture is used which contains or can react to give a greater excess of $CaCl_2$, particle growth proceeds rapidly and particle-to-particle fusion can result.

The $Ca_2ClPO_4$ is obtained as a compact cake bound together with the slight amount of excess $CaCl_2$. As the excess $CaCl_2$ is removed by washing with water, the cake disintegrates without grinding. The $Ca_2ClPO_4$ is dried and is then in the form of a finely divided powder, i.e. average particle diameter of 5 to 10$\mu$, of high purity. A typical analysis is: Determined, wt. percent Ca, 38.06; Cl, 16.6; PO, 44.7; total 99.36. Theoretical wt, percent Ca, 38.06; Cl, 16.8; $PO_4$, 45.09; total 99.95.

In all of the analyzed samples of $Ca_2ClPO_4$ prepared by this method the analytical results obtained showed no deviations from theoretical values which exceeded normal deviations in the analytical methods used. Analyses by X-ray diffraction showed no impurity phases to be present in detectable quantities. Differential thermal analysis of samples of $Ca_2ClPO_4$ prepared by this procedure showed only the incongruent melting of $Ca_2ClPO_4$ followed by dissolution of the resultant chlorapatite, $$Ca_5Cl(PO_4)_3$$

in the melt.

This procedure for preparation of $Ca_2ClPO_4$ is the only method known to me that yields this compound as an extremely pure, well crystallized and finely divided powder. Other known methods have given products less pure, of undesirable particle size, highly sintered, poorly crystallized or possessing a combination of these undesirable characteristics. The procedure described here is efficient and a conveniently carried out on a large or small scale in conventional processing facilities. A major advantage of this procedure is found in the high degree of purity and reproducibility which is obtained.

$$Ca_2ClPO_4$$

apparently does not deviate from stoichiometry by a measurable amount. Thus, if the proper precautions are taken to provide a slight excess of $CaCl_2$ during reaction, no analysis is required to assure purity. Microscopic examination is sufficient analysis to detect any foreign phases which could arise from a deficiency of $CaCl_2$.

While specific examples have been given of preparation of $Ca_2ClPO_4$, it will be understood that various changes, omissions and substitutions may be made within the true spirit and scope of the invention as defined in the appended claims.

What I claim as new and desire to secure by Letters Patent of the United States is:

1. A process for producing $Ca_2ClPO_4$ in the form of a finely divided, highly crystalline and free-flowing powder of high purity comprising the following steps in sequence:
   (a) reacting together $CaHPO_4$ and $CaCO_3$ at elevated temperatures in approximately equimolar ratios to obtain a mixture of $Ca_3(PO_4)_2$ and $CaO$;
   (b) mixing the product of step (a) with granular $NH_4Cl$ to form a batch in an amount in excess of two moles $NH_4Cl$ for each two moles of $CaHPO_4$ used in step (a) and reacting said batch at elevated temperature in a non-reactive atmosphere to form $CaCl_2$ in situ, and continuing to react said batch to allow the reaction of said $CaCl_2$ with said $$Ca_3(PO_4)_2$$

to form the desired particulate $Ca_2ClPO_4$ as a compact cake bound together by excess $CaCl_2$; and
   (c) removing said excess $CaCl_2$ by lixiviating the cake with water to produce the desired free-flowing $$Ca_2ClPO_4$$

crystalline particulate material.

2. The process of claim 1 in which:
   (a) the $CaHPO_4$ provided in step (a) contains an excess of $CaO$ in order to provide an excess of $CaO$ from the reaction of step (a), and in which the reaction of step (a) is conducted in the temperature range of 1050–1150° C.;
   (b) the $NH_4Cl$ step (b) is provided in an amount of about three moles for each mole of $CaHPO_4$ used in step (a), and the reaction of $CaCl_2$ with $Ca_3(PO_4)_2$ of step (b) is performed in the temperature range of about 750–850° C.; and
   (c) the excess of $CaCl_2$ of step (c) is removed by lixiviating the cake with water.

3. The process of claim 2 in which:
   (a) the reaction of step (a) is carried out in air at a temperature of about 1100° C.; and
   (b) the reaction of $CaCl_2$ with $Ca_3(PO_4)_2$ of step (b) is carried out in the temperature range of 760–780° C.

References Cited

Klement et al.: Naturwissenschaften 29, 1941, pp. 301–302, q3N7 Scientific Library.

OSCAR R. VERTIZ, *Primary Examiner.*

H. S. MILLER, *Assistant Examiner.*